United States Patent [19]

Hodson

[11] Patent Number: 4,966,927

[45] Date of Patent: Oct. 30, 1990

[54] EPOXY RESIN BINDER COMPOSITIONS AND CURED PRODUCTS OBTAINED THEREFROM

[76] Inventor: James V. Hodson, 1650 East 500 South, Fruit Heights, Utah 84037

[21] Appl. No.: 375,284

[22] Filed: Jul. 3, 1989

Related U.S. Application Data

[63] Continuation-in-part of Ser. No. 150,895, Feb. 1, 1988, abandoned, which is a continuation-in-part of Ser. No. 905,493, Sep. 10, 1986, abandoned.

[51] Int. Cl.$^5$ .......................... C08L 63/02; C08K 3/36
[52] U.S. Cl. .................................... 523/401; 523/443; 523/466; 525/523
[58] Field of Search ............... 523/401, 443, 466, 400; 525/523

[56] References Cited

U.S. PATENT DOCUMENTS

| | | | |
|---|---|---|---|
| 3,051,084 | 8/1962 | Scheibli | 523/400 |
| 3,251,708 | 5/1966 | Schmetterer | 523/400 |
| 3,265,647 | 8/1966 | Schaeffer et al. | 523/443 |
| 3,798,191 | 3/1974 | Donnelly | 523/400 |
| 4,053,445 | 10/1977 | Schulze | 524/315 |
| 4,269,724 | 5/1981 | Hodson | 252/171 |
| 4,310,672 | 1/1982 | Raghu et al. | 546/155 |

*Primary Examiner*—Lewis T. Jacobs

[57] ABSTRACT

New epoxy resin binder compositions which have outstanding pot life but can be cured to form products having excellent physical properties are obtained by mixing the epoxy resin with a new curing agent comprising a reaction product of methylene chloride and monoethanol amine in special proportions. The new binders are particularly suited for use in combination with Portland cement, sand and water to form improved overlay coatings for already form concrete or asphalt surfaces.

14 Claims, No Drawings

EPOXY RESIN BINDER COMPOSITIONS AND CURED PRODUCTS OBTAINED THEREFROM

BACKGROUND OF THE INVENTION

This application is a continuation-in-part of my application Ser. No. 150,895, filed Feb. 1, 1988, which in turn is a continuation-in-part of my application Ser. No. 905,493, filed Sept. 10, 1986, both now abandoned.

Field of the Invention

This invention relates to epoxy resin compositions, and more particularly to long life epoxy resin binder compositions and cured products obtained therefrom.

Specifically, the invention provides new epoxy resin binder compositions which have a surprisingly long pot life and are able to be cured alone or in combination with cement and aggregate compositions to form products having excellent resistance to temperature change, good resistance to chemicals as well as outstanding compressive strength. The new compositions broadly comprise mixtures of an epoxy resin and a curing amount of a liquid reaction product of methylene chloride and monoethanol amine combined in special proportions.

The invention further provides compositions obtained by mixing the above-noted binder compositions with filler and aggregate materials, and preferably cement and water, and curing the same to form cured products having outstanding resistance to temperature change, excellent resistance to chemicals as well as outstanding compressive strength.

The invention further provides a process for utilizing a preferred composition containing the new binder compositions, cement, sand and water for the resurfacing of worn concrete and asphaltic roadway and bridge surfaces which comprises applying a thin layer of the composition to the said surfaces and allowing it to cure to a hard durable weather resistant surface.

During the past years there has been tremendous activity in building concrete highways, runways, bridges, and the like throughout the United States. The extreme changes in temperature as well as addition of icing chemicals, such as salt, as well as increase in the weight of trucks and the like, have caused a great deteriorating effect on these concrete products, and many of them are now in a weakened condition and badly in need of repair.

Many highway departments are now urgently seeking materials that can be used to restore the deteriorated products, and or materials that can be applied to the products to prevent further deterioration. Many materials have been suggested for this use but they have generally failed to meet the desired need.

For example, many of the compositions suggested utilize expensive curing systems which would make it prohibitive for use on large scale applications, such as highways and bridges. Others utilize compositions which have a short pot life such that the compositions could not be utilized in conventional mixing equipment and then taken over some distance and applied to roadways and bridges as the compositions would set up before the application could be made. Still other suggested compositions fail to give products having the desired resistance to rapid changes in temperature as well as resistance to chemicals, such as salt, as well as other chemicals such as oil, gasoline, solvents and the like. Still others fail to give products having the desired compressive strength required for concrete and other products. Others give compositions having high shrinkage and poor adhesion and are easily removed from the substrate.

It is an object of the invention, therefore, to provide a new type of epoxy resin binder compositions which permits one to solve many of the above-noted problems relative to road and bridge repair It is a further object to provide an epoxy resin binder composition which has a long life and can be used for the treatment of large areas such as roadways and runways. It is a further object to provide new epoxy resin binder compositions which can be cured to form products having excellent resistance to change in temperature as well as resistance to chemicals. It is a further object to provide new epoxy resin compositions which give cured products having outstanding compressive strengths. It is a further object to provide an epoxy resin binder composition that can be used to prepare superior over ay coatings for worn concrete and asphaltic surfaces. It is a further object to provide a method for treating old concrete and asphaltic surfaces to restore their strength and to impart resistance to further deterioration by weather and the like. It is a further object to provide a method for preparing concrete and asphaltic casting products which do not shrink on cure and retain their shape after long periods of time. These and other objects of the invention will be apparent from the following detailed description thereof.

SUMMARY OF THE INVENTION

It bas now teen discovered that these and other objects can be accomplished by the new epoxy binder compositions of the present invention which present for the first time an inexpensive binder composition which can be combined with cement, sand an the like, and cured to form products which solve many of the above-described problems.

The new binder compositions of the present invention broadly comprise mixtures of an epoxy resin, and particularly a glycidyl polyether of a polyhydric phenol, and a curing amount of a liquid reaction product of methylene chloride and monoethanol amine combined in special proportions, i.e. 5% to 20% by volume of monoethanol amine with 80% to 95% by volume of methylene chloride. It has been surprisingly found that this new composition has outstanding pot life and when stored in close containers the composition remains stable for many days without undue thickening of the combination. Surprisingly, however, when that composition is utilized as a binder in the formation of various coatings or castings, the mixture sets up to form a cured product having excellent properties. Further, when the new compositions are used as binders for compositions containing Portland cement and asphaltic materials, the resulting products form outstanding overlays for already prepared surfaces. It has been found, for instance, that the products obtained by curing the above-noted binder compositions with the fillers, such as Portland cement, have excellent resistance to change in temperature and have good resistance to chemicals, such as salt, and other chemicals, as oil, gasoline and solvents, such as the chlorinated solvents. The cured coatings also have outstanding compressive strength beyond that which has been obtained heretofore, The new cured products also have good adhesion to surfaces, such as concrete, asphalt and metal surfaces, and can be used as overlays for highways, runways, floors and the like without fear of chipping and scaling off.

The new filler-binder compositions of the invention are also easily prepared in conventional mixing equipment and have such a long pot life they are able to be transported and contained in conventional trucking equipment for long periods without fear of setting up in the equipment.

The new cured binder compositions are also outstanding in that they have very low shrinkage and are superior in this regard in comparison to many known prior art epoxy resin compositions. This gives them added advantage in the above-noted use as overlays for already constructed cement highways and runways.

The above-noted discovery is quite unexpected in view of what was known in the prior art prior to the present discovery. It was known, for example, to use methylene chloride as a solvent for epoxy resins which were used as very thin (0.2 mil to 2 mil) coatings for metal surfaces when cured at very high temperatures (Schmetterer et al—U.S. Pat. No. 3,25,708). Here the methylene chloride is quickly evaporated and one would not expect such a solvent to be used to make curing agents for thick castings where such quick evaporation is not possible. Furthermore, Schmetterer et al teaches in col. 3, line 60 that such compositions containing methylene chloride had very limited pot life. It was surprising to find that the curing agents of the present invention could be used to form binder compositions have a long pot life and then could be easily applied as a thick overlay coating and cured to form a hard insoluble product.

It was also unexpected to find that the new binder compositions could be combined with fillers, such as Portland cement, sand, aggregate, and the like, to form overlay coatings have superior properties. Donnelly—U.S. Pat. No.3,798,191, for example, discloses improved epoxy resin compositions containing cement but those results are obtained only by using a special and expensive pozzolan shale product which contains many metal oxides, such as $Al_2O_3$ and $Fe_2O_3$. There is no suggestion in this reference of obtaining superior cement products without the pozzolan shale but using a new type of curing agent.

Scheilib—U.S. Pat. No. 3,051,084 discloses coatings for cement and asphaltic surfaces containing an epoxy resin and an alkylphenol. Scheibli discloses that his compositions can be used without solvents (col.2, line 4), but suggests the use only of hydrocarbon solvents, such as xylene. There is no disclose of the use of the curing agents of the present invention prepared from methylene chloride and monoethanol amine.

DETAILED DESCRIPTION OF THE INVENTION

The special curing agents used in the preparation of the binder compositions of the present invention are prepared by reacting methylene chloride with monoethanol amine in special proportions. The amount of the methylene chloride should vary from about 80% to 95% by volume and the amount of the monoethanol amine should vary from about 5% to 20% by volume. Preferred products are obtained by combining 80% by volume of methylene chloride with 20% by volume of the monoethanol amine. When more than 20% by volume of the monoethanol amine is employed, the product losses its ability to cure the epoxy resins to the desired hard conditions.

The reaction product is formed by mixing the two components together, preferably at ambient temperature, and allowing the mixture to stand. The resulting product is a liquid reaction product having a viscosity from about 29 to 48 CPS @25° C. a boiling point from about 104° F. to 190° F. and specific gravity between about 19 and 32/25° C. It has good pot life and can be stored for extended periods without loss of curing ability. The curing ability varies widely from the action of the 2 components used separately indicating an interreaction.

The epoxy resins to be used in preparing the superior binder compositions are those materials possessing more than one vicinal epoxy group, i.e. more than one

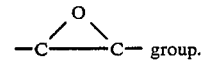
group.

For clarity, many of the epoxy resins referred to as polyepoxides and particularly those of polymeric type are described in some cases in terms of epoxy equivalency. The meaning of this expression is described in U.S. Pat. No. 2,633,458, and so much of that disclosure referring to the epoxy equivalency is incorporated herein by reference. The polyepoxides used in the present invention are those preferably having an epoxy equivalency greater than 1.0.

Various examples of polyepoxides that can be used in the present invention are also given in U.S. Pat. No. 2,633,458 and such examples are incorporated herein by reference.

Examples of polyepoxides to be used in preparing the new binder compositions of the present invention include, among others, the glycidyl ethers, and particularly the glycidyl ethers of polyhydric phenols and polyhydric alcohols. The glycidiyl ethers of polyhydric phenols are obtained by reacting epichlorohydrin with the desired polyhydric phenol in the presence of alkali. Glycidyl ethers of 2,2-bis(4-hydroxyphenyl)propane in the liquid and solid forms are examples of such glycidyl ethers. Other examples include the glycidyl ethers of 1,1,2,2-tetrakis(4-hydroxyphenyl)ethane (epoxy value of 0.45 eq/100 g. and melting point of 85° C.) and polyglycidyl ether of 1,1,5,5-tetrakis(hydroxyphenyl) pentane (epoxy value 0.514 eq/100 g.) and the like, and mixtures thereof.

Other examples of polyepoxides include the epoxidized esters of polyethylenically unsaturated monocarboxylic acids, such as epoxidized linseed, soybean, perilla, oiticia, tung, walnut and dehydrated castor oil, methyl linoleate and the like.

Other examples include the epoxidized esters of unsaturated alcohols and polycarboxylic acids, such as for example, di(2,3-epoxybutyl) phthalate, di(2,3-epoxybutyl) adipate, di(2,3-epoxy octyl) terephthalate, and the like.

Other examples include the epoxidized esters of unsaturated alcohols and unsaturated polycarboxylic acids, such as 2,3-epoxybutyl 3,4-epoxypentanoate, 3,4-epoxypropyl 3,4-epoxyhexanoate, and the like.

Still another group comprise the epoxidized polymers and copolymers of diolefins, such as butadiene. Examples of this include, among others, butadiene-acrylonitrile copolymers, butadiene-styrene copolymers and the like.

The above-described reaction products of the methylene chloride and monoethanol amine can be used as the sole curing agent or other curing agents can be used in combination with the said reaction products. Such additional agents include the known materials possessing primary and/or secondary amine groups, such as, aliphatic amines as ethylene diamine, triethylene tetramine, and the like.

Particularly preferred additional curing agents to be used include the amino hydrogen containing polyamides prepared by reacting a polybais acid with an excess of an aliphatic amine. Particularly preferred are the polyamide compositions derived from polymeric fat acids and aliphatic polyamines. Polyamides of this general type are disclosed in Cowan et al—U.S. Pat. No. 2,450,940.

The polymeric fat acids employed in preparing the polyamides are those resulting from the polymerization of drying or semi-drying oils, or the free acids or simple esters of such acids. The term "polymeric fat acid" as used herein includes the polymerized mixture of acids obtained by polymerization and which mixture generally contains a predominant portion of dimeric acids, a smaller quantity of trimeric and higher polymeric acids, and some monomer.

Polyamides coming under special consideration are those having molecular weights between about 1,000 and 10,000 and melting points between 30° C. and 230° C.

Coming under special consideration, particularly because of the very high compressive strengths and water and chemical resistance obtained therewith are the primary amine curing agents. Especially preferred are the primary amines, such as monoethanol amine, tertiary butyl amine, cyclohexylamine, benzylamine, hexamethylenediamine, and the like, and mixtures thereof.

The polymeric resinous binder compositions of the present invention can be prepared by any suitable method. They can be prepared, for example, by merely mixing the new methylene chloride monoethanol amine complex with the desired polyepoxide. Additional curing agents, solvents, fillers, and the like may also be added as needed. As noted, the new methylene chloride-monoethanol amine complexes formed as above have extended pot life and can be stored at ambient temperatures for up to at least 10 days before any thickening occurs. In the later case, the viscosity can be restored by the addition of about 10% to 25% by volume of water so that the combination can readily be used for mixing with the polyepoxide and formation of the binder.

The proportions of the components to be utilized in the formation of the new binder compositions can vary within certain limits. It is important that the methylene chloride make up at least 40% by volume of the mixture in order to obtain the desired results. That amount may be determined by considering the amount of methylene chloride used in making the reaction product, as well as any monomeric methylene chloride that can be added to the mixture to bring the amount up to the desired minimum required. If less than the 40% is present the mixture may become explosive when held in a closed container. The amount of the methylene chloride-monoethanol amine reaction product to be used by itself may vary depending upon the intended use and the type of filler to be employed, e.g. the presence of sand and other absorbent fillers. In general, the reaction product may vary from about 15% to about 70% by volume, and more preferably from about 30% to 60% by volume.

If another curing agent is employed in the mixture, the amount of that secondary agent may also vary as needed. In general, the amount will vary from about 5% to 20% by volume, and preferably from about 6% to 15% by volume.

The above-noted ingredients are combined by stirring together at ambient temperature. In some cases, heat may be applied to assist in the formation of the binder. In general, temperatures employed may vary from about 70° F. to about 100° F.

The resinous binder compositions of the present invention as prepared above are fluid to viscous liquid compositions. Their color will depend in many cases on the amine curing agent employed but in many cases will be colorless compositions. When prepared under standard conditions, they will possess very little odor and can be used directly with standard chemical precautions.

As noted, the above-described binder compositions are particularly valuable as binders for aggregate and cement products. They can also be used directly as such and cured to form valuable castings and pottings. The binders can be cured directly by merely placing the binder in the desired mold or casting and allowing the binder to cure at ambient temperature. The cure can be hastened by application of heat, such as temperatures ranging from about 90° F. to about 125° F. The resulting castings or molded products have many of the above-noted desired properties, such as outstanding strengths and water and chemical resistance.

The aggregate used in such aggregate-binder compositions may vary over a wide range depending on the intended use of the product. In general, the aggregate is rather finely divided and has a size from about 1/16 to ¾ inch. Preferably at least 80% of the aggregate have a size from about ⅜ to ¼ inch, although larger sizes may be used for some purposes. Preferred materials include crushed rock, crushed shells, crushed quartz, aluminum oxide particles and the like. Particularly preferred are the minerals, and especially siliceous materials, such as crushed rock. The aggregate is preferably free of sand and other fines. If the aggregate does contain sand, additional amounts of binder may be employed over that used with the crushed rock.

The new binders of the invention used with aggregate free of sand gives cured castings having outstanding properties, such as, for example, greatly improved compressive strength. This discovery was quite unexpected as it was thought that sand was required to give the cured casting the needed strength.

In addition to the aggregate described above, other fillers and additives can be added and combined with the new binders of the present invention alone or in admixture with each other or with the aggregate. Such other components include, among others, asphalts, such as AC-10 asphalt, tar sands, Portland cement, and preferably Portland cement No. 3 ground rubber, ground plastic, and the like, and mixtures thereof.

Coming under special consideration are the binder compositions containing Portland cement, sand and water which are outstanding for the formation of overlays of already prepared concrete and asphalt surfaces which have deteriorated. Such compositions are preferably prepared from Portland cement type 3, silica sand No. 8 to 30, water and mixtures of the polyepoxide and the new methylene chloride-monoethanol amine reaction products as described above. Such compositions have excellent pot life and can be held in conventional mixing equipment for sometime before being spread out on the desired surface as a thin film and cured.

Coming under special consideration as a preferred embodiment of the invention is the use of the binders of the invention with tar sands. In the past the combination of binders with tar sands have been very ineffective compositions as they begin to loss strength at high temperatures and are unsuited for use where heavy loads are required such as on highways and runways.

Improved results are also unexpectedly obtained with asphalts, such as AC-10 asphalt in that the cured products have excellent compressive strengths and resistance to chemicals.

Also under special consideration as a preferred embodiment of the invention is the use of the binders for Portland cement, alone or in combination with the above-noted aggregates. The excellent properties obtained by this use of the binder are illustrated in Example II below.

The amount of the binder to be used with the above-noted components can vary over a wide range depending on the intended use and the type of component selected. In most cases the amount of the filler component added may vary from about 500 to 3000 pounds per 100 pounds of binder, and preferably from about 500 to 2000 pounds per 100 pounds of binder.

With the use of aggregate and Portland cement, the preferred formulation comprises about 60 to 500 pounds of binder, about 70 to 150 pounds of water, 600 to 800 pounds of Portland cement and 1000 to 3000 pounds of aggregate. If one removes the cement from the initial mixture, the amount of the binder should be increased about 2 to 3 times that normally required.

The binder/filler compositions may be prepared by merely mixing the two or more components together in the desired proportions. With the aggregate-binder compositions, superior results are generally obtained by mixing the water, cement and aggregate together for about 15 to 30 minutes wet out period, and then adding the binder to that mixture and stirring thoroughly for about another 10 to 25 minutes to be sure the binder is thoroughly dispersed in the water-cement-aggregate compositions.

The binder/filler compositions have good pot life when stored in closed containers. This enables the binder/filler compositions to be prepared at the plant and carried in the closed mixer equipment to the desired site and spread out on the road or runway before the mixture begins to set up.

When spread out and compressed the binder/filler composition can be ready cured to form hard insoluble castings having the outstanding properties, such as high compressive strengths, good flexural strengths and other properties illustrated in Example II below. Curing can be accomplished at ambient temperature but generally speeded by the addition of heat. In general, cure temperatures vary from about 60° F. to about 120° F.

As noted, the compositions of the invention may be utilized for a great variety of applications. As indicated, the aggregate-binder compositions can be used to form cement products having many desired properties The aggregate-binder compositions can be cured directly to form desired castings, pottings or moldings, or they can be applied as coatings or overlays for other surfaces. Preferred substrate for coatings or overlays comprise already formed cement or concrete surfaces, asphalt surfaces, metal surfaces, wood surfaces, and the like. The aggregate-binder compositions are particularly suitable for use in the reconstruction of deteriorating highway, bridges and runway surfaces as described hereinabove. In this application, the surfaces are cleaned of dirt and other foreign material and the aggregate-binder compositions spread on the substrate to the desired depth. In most cases, in resurfacing of highways and bridges one may utilize depths from about 1 to 2 inches of the composition. Pressure may be applied to compact the overlay and provide better protection for the substrate. The composition may be cured by allowing the mixture to set at ambient temperatures such as from about 60° F. to about 90° F. or external heat may be applied to hasten the cure.

The new binder compositions as well as the aggregate binder compositions can be utilized also for many other applications for which epoxy resins have been found useful, such as in the preparation of adhesives, in coating and lamination of paper, electrical pottings and the like.

The following examples illustrate the present invention Unless otherwise indicated, parts disclosed in the examples are parts by volume. Polyether resins described in the examples by letters are those described in U.S. Pat. No. 2,633,458. The concrete used in the examples comprised hydraulic cement (Portland cement.). The aggregate generally varied in size from ⅜ inch to ¼ inch.

EXAMPLE I (A) This example illustrates the preparation of the curing agent comprising the reaction product of methylene chloride and monoethanol amine and its use in the curing of a liquid glycidyl polyether of 2,2-bis-(4-hydroxyphenyl)-propane.

80 Parts by volume of methylene chloride was combined with 20 parts by volume of monoethanol amine at room temperature and the mixture was stirred and allowed to stand. The resulting reaction product was a clear liquid having a viscosity CPS @25° C. of 37.9, a sPecific gravity of 25/25° C., a boiling point of 165° F. and weight of 9.60 lbs/GL.

100 Parts by volume of the above product was combined with 100 parts by volume of the liquid glycidyl polyether of 2,2-bis(4-hydroxyphenyl)propane (Polyether A described in U.S. Pat. No. 2,633,458). This mixture was stirred together and placed in a closed container. The mixture showed excellent pot life and appeared to thicken only slightly even after several days in storage.

A portion of the above-noted mixture with the epoxy resin was spread out as a thick coating over a block of concrete. The coating cured at 80° F. to form a very hard coating having excellent resistance to water, chemicals and solvent.

(B) In a related experiment, 30 parts by volume of monoethanol amine was combined with the liquid glycidyl polyether noted above, and the mixture spread out on concrete blocks as noted above and cured at 80° F. The resulting coating thickened but did not form a hard coating as noted above for the use of the new curing agent of the present invention.

EXAMPLE II

This example illustrates the superior results obtained by using the methylene chloride-monoethanol amine reaction product with the glycidyl polyether described above as a binder for Portland cement.

100 Parts of the product was combined with 100 parts of the glycidyl polyether and the mixture stirred at ambient temperature.

7.14 Parts by volume of water, 14.29 parts by volume of Portland cement and 71.43 parts by volume of finely divided aggregate were mixed together and allowed to set for 20 minutes at ambient temperature.

At the end of the 20 minute wet out period, 7.14 parts by volume of the above-described binder composition was mixed with the aggregate-cement mixture described above and the combined mixture stirred for about 20 minutes to insure a thorough mix. This mixture had a workability of approximately one hour after mixing when maintained at an ambient temperature of about 80° F.

The above aggregate-binder mixture was allowed to cure at 80° F. and in about 8 hours had set up to a very hard casting having excellent compressive and shear strengths and excellent resistance to water, chemicals and solvents.

Some of the superior properties of the aggregate-binder compositions are shown below:

Compressive Strength

Samples of the above-noted aggregate-binder castings were tested for compressive strengths according to the standard ASTM compressive strength:test:
The results are shown below:

| 24 hours | 3,500 psi |
|---|---|
| 3 days | 4,000 psi |
| 7 days | 5,000 psi |
| 14 days | 6,000 psi |
| 21 days | 6,000+ psi |
| 6 months | 9,200 psi |

In a comparative experiment using a binder made up of only the Polyether A and the primary amine curing agent which had been diluted with ethanol and mixed with the aggregate, water and cement as noted above, the cured product had a compressive strength of a conventional cement casting (6 bags) which was about 2,800 psi after 3 days and 7 days at 3,500 psi.

Flexural Strength

A beam of the casting measuring about $3 \times 3 \times 11$ inches was tested for flexural strength according to ASTM test C-293.
The results are shown below:

| 7 days | 800 psi |
|---|---|
| 14 days | 1,000 psi |
| 21 days | 1,021 psi |

Bond Strength

Test specimens were prepared by cutting existing concrete cylinders ($6 \times 12$ inch) at a 60 degree angle to the longitudinal axis. The sawed surface of each specimen half was then coated with the uncured binder prepared as above. The coated specimen was then placed in a mold and the binder composition prepared as noted above was placed over the coated wet area and allowed to cure to form a complete cylinder.

The cylindrically shaped test specimen was then tested in compression. In all cases, the specimens cracked or broke apart within the existing concrete as opposed to the bonded area or the cured binder section of the specimen. Shearing forces on the bonded surfaces were approximately 2,000 psi.

Freeze-Thaw and Chlorine Resistance

Tests were conducted to determine the effects of temperature cycling and brine solutions on bonded specimens. The specimens for this testing were prepared by cutting 3 inch cross sectional wafers from cylinders (6inch by12 inch) of cured concrete. The concrete sections were then coated with a seal coat of the binder and a one inch layer of the above prepared new binder composition was poured over the seal coating and the combination allowed to cure at ambient temperature.

The freezing and thawing test was conducted according to ASTM C-884. No apparent damage was noted. The specimens were then placed in the freeze-thaw chamber and cycled between 0° F. and 100° F. for 40 cycles while submerged to one half their depth in a 3 percent road salt solution. Again, no apparent damage resulted.

Additional testing for freeze-thaw and chloride resistance was conducted as follows. Specimens were produced by placing the above-noted new binder composition into molds (2 inch by $2'' \times 2''$, and allowed to cure for 7 days. Three of such specimen cubes and three control cubes prepared from conventional concrete were subjected to 40 freeze-thaw cycles of 0° F. to 100° F. while $\frac{2}{3}$ of the specimens were submerged in a 3% road salt solution. The specimens prepared from the new binder appeared to be undamaged while the control specimens had started to scale.

Permeability

Cube specimens of the new binder cured at ambient temperature with concrete specimens as control were submerged in a phenol dye solution for 21 days at room temperature. At the end of the test period the new binder specimens showed very little penetration while the concrete control specimens showed penetration of the dye nearly to the center.

Shrinkage

Shrinkage was determined by pouring the uncured binder composition into an aluminum channel (1 ⅛ inch by 1 inch by 45 inch) mold and curing at room temperature for 14 days. A micrometer was attached to one end of the mold such that shrinkage could be determined periodically until a maximum reading was obtained. The results of the test indicate a shrinkage factor of $4.44 \times 10^{-4}$ inches per inch (0.53 inch per 100 foot)

Thermal Coefficient

This test was according to ASTM C-531 with the specimen size increased from the standard to $2'' \times 2''$ by 17.8''. This was done to accommodate the increased size of the aggregate ($\frac{3}{8}''$) used in the new binder composition. To offset the larger specimen size the samples were subjected to a longer time period at various temperature ranges.

| Coefficient | |
|---|---|
| Specimen #1 | Specimen #2 |
| $3.69 \times 10^{-6}$ | $5.08 \text{ z } 10^{-6}$ |

-continued

| Coefficient | |
|---|---|
| Specimen #1 | Specimen #2 |
| .47 in/100° F./100 ft. | .61 in/100° F./100 ft. |

Modulus of Elasticity

Tests were conducted on the new cured aggregate-binder composition which had been cured five months. SR-4 strain gauges were used to determine the modulus of elasticity with the results slightly under one million psi (978,000).

EXAMPLE III

This example illustrates the improved properties obtained by using the methylene chloride-monoethanol amine reaction product with the glycidyl polyether as a binder for asphalt material 7 Parts of methylene chloride were blended with three parts of the liquid glycidyl polyether defined above. To this mixture was added ten parts of the methylene chloride-monoethanol amine reaction product formed in Ex. 1. Five parts of the resulting mixture was then combined with 80 parts of asphalt.

The above mixture was thoroughly mixed and placed in a paving machine and compressed. The asphaltic product was cured at ambient temperature and in 24 hours set up to form a hard flexible product The product on analysis showed the following properties: increased compressive strength, increased flexural strength, increased bonding capacity to other asphalt or concrete materials, and increased resistance to change on rapid change of temperature.

EXAMPLE IV

In the previous examples, the aggregate used was substantially free of sand. In this experiment, 1 part by volume of sand was added to the aggregate mix and 1 additional part of the new binder composition was also added. Related superior results are also obtained.

EXAMPLE V

The binder-aggregate composition prepared in Example II was used as an overlay (about 1 ½ inch thick) on already prepared cement concrete roadway, asphalt roadway as well as large metal plates on bridge surfaces. After curing at 80° F. or about 8 to 12 hours, the coatings had set up hard, had good adhesion to the said surfaces and displayed many of the superior properties noted above.

EXAMPLE VI

The first portion of Example was repeated in that 30 parts by volume of methylene chloride was combined with the 20 parts by volume of monoethanol amine. This mixture was allowed to stand on the shelf at ambient temperature for approximately 10 days and still displayed good shelf life. After that time the mixture began to thicken, but with addition of 20 parts by volume of water, the mixture again assumed its original viscosity and was used successfully in the preparation binder composition as in Example II.

EXAMPLE VII

Example II was repeated with the exception that the binder was allowed to cure before adding the aggregate. A hard insoluble product was obtained having many improved properties.

EXAMPLE VIII

Example I was repeated with the exception that the Polyether A was replaced with Polyether B as described in U.S. Pat. No. 2,633,458. Related results are obtained.

EXAMPLE IX

Example II was repeated with the exception that in the preparation of the aggregate-binder composition, the Portland cement was omitted. In addition, the amount of the new binder was increased about three times to compensate for the removal of the cement. Related superior results were obtained in this case also.

EXAMPLE X

Example III was repeated with the exception that the asphalt was replaced with equal amount to raw tar sands particles. Related results are obtained.

EXAMPLE XI

An overlay binder composition was prepared as follows: 0.2 parts by volume of the methylene chloride-monoethanol amine reaction product produced in Example I was combined with 0.2 parts of Polyether A. After stirring together, this reaction product was combined with 2 parts by volume of type 3 Portland cement, 4 parts by volume of silica sand No. 30 and 0.9 parts by volume of water. This mixture was mixed in a transit mixer for 20 minutes and then poured into a screed box where it was applied as a ¼ inch thick coating over already formed concrete roadways. The coating was allowed to set for about 12 hours and the roadway was put in regular operation The resulting coating was very hard and had good adhesion to the concrete surfaces The coating was resistant to solvents and other chemicals and gave excellent strength and protection to the roadway, particularly against rapid changes in temperature.

EXAMPLE XII

Example XI was repeated with the exception that the sand was replaced with finely divided slag. Related results were obtained.

EXAMPLE XIII

Example I was repeated with the exception that the curing agent was prepared by combining 95 parts by volume of methylene chloride and 5 parts by volume of monoethanol amine. Related results are obtained.

EXAMPLE XIV

Example I was also repeated with the exception that the curing agent was one prepared by combining 85 parts by volume with 15 parts by volume of monoethanol amine The resulting liquid reaction product gave related results when combined with the epoxy resin as in Example I.

I CLAIM AS MY INVENTION:

1. A resinous binder composition useful for preparing improved concrete and asphaltic products comprising a mixture of (1) a polyepoxide having an epoxy equivalency greater than 1.0, and (2) a curing amount of a curing agent comprising a liquid reaction product of methylene chloride and monoethanol amine.

2. A composition as in claim 1 wherein the curing agent comprises a reaction product of 5% to 20% by volume of monoethanol amine and 80% to 95% by volume of methylene chloride, the amount of the methylene chloride in the binder counting the units of the methylene chloride combined in the reaction product curing agent as well as any monomeric methylene chloride that may be present or added as a solvent being in excess of 40% by volume of the binder.

3. A composition as in claim 1 wherein the polyepoxide is a glycidyl polyether of a polyhydric phenol.

4. A composition as in claim 1 wherein the polyepoxide varies in amount from 20% to 70% by volume of the total binder.

5. A composition as in claim 1 which also contains a filler.

6. A composition as in claim 1 wherein the composition so contains finely divided aggregate.

7. A composition as in claim 1 wherein the composition also contains Portland cement.

8. A composition as in claim 1 wherein the composition also contains Portland cement, aggregate and sand.

9. A composition as in claim 1 wherein the composition also contains Portland cement, sand and water.

10. A composition as in claim 1 wherein the composition also contains tar sand as a filler.

11. A composition as in claim 1 wherein the polyepoxide is a glycidyl polyether of 2,2-bis(4-hydroxyphenyl)propane.

12. A hard insoluble infusible product obtained by effecting a cure of the composition comprising a mixture of a polyepoxide having an epoxy equivalency greater than 1.0 and a curing amount of a liquid reaction product of 5% to 20% by volume of monoethanol amine and 80% to 95% by volume of methylene chloride.

13. A hard insoluble infusible product as defined in claim 12 wherein the composition contains a filler.

14. A hard insoluble infusible product as defined in claim 12 wherein the composition to be cured contains Portland cement, sand and water.

* * * * *